UNITED STATES PATENT OFFICE.

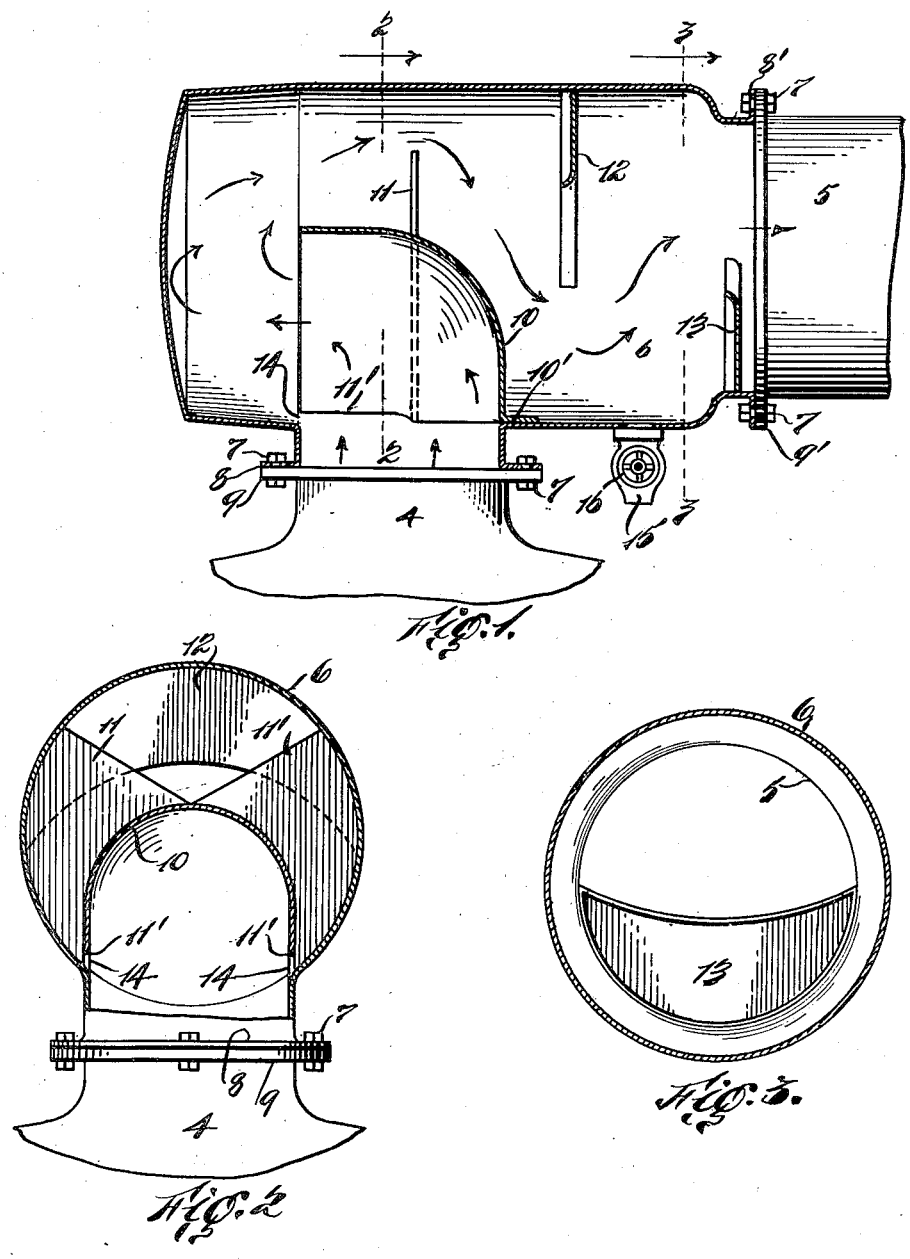

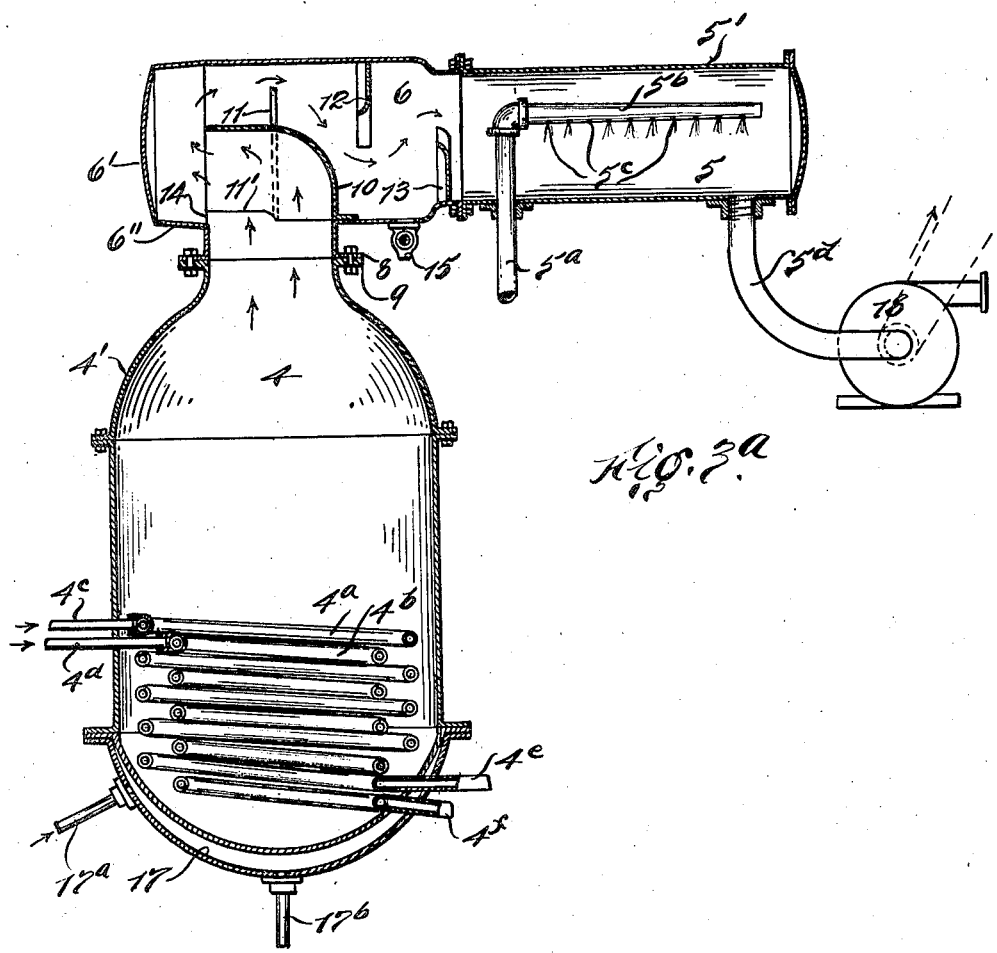

JOSEPH P. KIRKUP, OF ELMHURST, NEW YORK, ASSIGNOR TO THE BORDEN COMPANY, OF NEW YORK, N. Y., A CORPORATION OF NEW JERSEY.

METHOD OF RECOVERING SOLIDS FROM VAPORS AND MEANS FOR UTILIZING THE SAME.

1,416,215.

Specification of Letters Patent.

Patented May 16, 1922.

Application filed July 31, 1920. Serial No. 400,559.

*To all whom it may concern:*

Be it known that I, JOSEPH P. KIRKUP, a citizen of the United States, residing at No. 120 25th Street, Elmhurst, Queens County, New York, have invented a new and useful Method of Recovering Solids from Vapors and Means for Utilizing the Same, of which the following is a specification.

My invention relates to the separation of desired particles of matter from vapor in motion by which they are, owing to their minuteness and levitation, entrained, carried off, and usually lost; and, more particularly, to the recovery of solid constituents of milk hitherto thus lost during its condensation as by boiling it in so-called "vacuum pans" as per present approved practice.

The objects of my present invention comprise provision of a method of confining and directing, the stream of milk-containing vapor, such as to compel it to part with a preponderance of its thereby carried milk solids more certainly, completely and immediately, and at a location where more readily, economically, and with less risk of contamination collectible than heretofore, and the said objects also comprise provision of the hereinafter described means whereby my said method can be economically and effectively practiced.

I attain the objects referred to by aid, in the present instance, of the appliances illustrated in the accompanying drawings, in which:

Figure 1 is a central vertical sectional view of my separator comprising diagrammatic outlines of a part of a usual vacuum pan, and of a part of an ordinary condenser;

Figure 2 is a sectional view on the line 2—2 of Figure 1 and seen in the direction of the arrow contacting said line;

Figure 3 is a sectional view on the line 3—3 of Figure 1 and seen in the same direction as Figure 2.

Figure 3ᵃ is a central vertical sectional view showing my separator combined with a milk-condensing vacuum pan provided with means, diagrammatically indicated, for heating and for reducing atmospheric pressure, and also connected with a usual condenser provided with means diagrammatically indicated for reducing temperature and condensing the vapor.

Similar parts are indicated by similar reference numerals in all the figures.

Hitherto in the approved practice of condensing milk it has, so far as I know, been usually customary to conduct the vapors of evaporation from the usual outlet in the top of the vacuum pan to the inlet into the condenser through a pipe, or conduit, proportioned and dimensioned to afford as direct, short and unimpeded a passage as possible, the results being that considerable percentages of the milk have been carried by the vapor over into the condenser, and thence withdrawn and lost with the water of condensation. I am aware that it has been suggested to lengthen the connecting pipe referred to and interpose therein at a point relatively remote from the pan a device in the nature of a trap with the expectation of therein recovering, at the bottom thereof, some of the milk solids to be therefrom, according to their accumulation, intermittently withdrawn, in comparative driblets, apart from the remaining preponderating bulk of the condensed milk in the pan and exposed to different, and comparatively undesirable sanitary and other, conditions, and I believe that this has, for obvious reasons, proved relatively impracticable and undesirable, it being manifestly desirable, if only for cleanliness, that the vapors should pass from the pan to the condenser by as direct and short a route as is compatible with condensation and removal without undue interference with evaporation, thereby economizing not only in construction and space, but also, and more importantly, in the number and extent of parts and appliances to be kept in sanitary condition and air-tight under the diminished atmospheric pressure required for evaporating, or condensing, the milk at temperatures which though higher than normal are yet so low as not to injuriously affect the albumen and other constituents of the milk.

By the aid of my invention, an important percentage (in the neighborhood of at least 2%, for example) of the treated milk solids are automatically recoverable and restorable directly to the main body of condensing milk in the pan, without involving any separate operation and with rapidity and directness so great as to involve, during the operation, no undesirably different conditions from those required in the pan itself, nor any inferiority in the final products.

Basicly, my method comprises confining the vapor and, throughout the operation, maintaining it in the form of a unitary stream flowing through a single channel, and during its advance directing said stream, in its entirety, firstly, i. e. immediately upon its emergence from the pan proper, vertically upward, as indicated by the arrows in Figure 1, thence curvingly upward approximately 90° in a direction opposed to that in which it finally enters the condenser, and thence changing this course of flow to one in the opposite direction and reversingly curvingly upward approximately 180°, thus turning the entire stream upon itself in the form of an "ox bow" disposed in a vertical plane, and thereafter letting it proceed to the condenser either undirectly, or, as may be preferable to ensure additional recovery of solids, in an at first downwardly and thereafter upwardly curving course. My impartation to the course of the vapor of said curve of 180° at the point and in the directions above described is, as I have discovered, by itself usually sufficient to ensure the dropping, or precipitation, of the most part of the milk solids carried by the vapor, and in the space within which the said curve occurs and from whence they are constantly returned by gravity, as hereinafter described, to the pan where they recombine with the therein mass of condensing milk.

The drawings illustrate my, at present preferred, form of apparatus for working my above described method. I join airtightly with the usual hermetically enclosed vacuum pan, 4, adjacent its outlet, or orifice, for vapors, and, similarly, to the hermetically enclosed condenser, 5, adjacent its inlet, or opening, for passage thereinto of the vapors, my novel also hermetically enclosed device for imparting the above described courses to the vapor arising from the pan, and which device is hereinafter termed my "separator" and comprehensively designated in the drawings by the reference numeral 6. The separator comprises a hermetically enclosing casing composed, preferably, of metal and of strength requisite to withstand exterior atmospheric pressure in operation, during which the interior is, by usual means, maintained at the lower than normal pressure usual in the pan and the condenser. The above referred to air-tight joints between the respective members, 4, 5, and 6, are effected by any usual convenient means, as for example by securing, as by bolts, 7, flanges, 8, 8', carried by the separator to corresponding flanges, 9, 9', carried respectively by the pan and by the condenser. The separator is, for the most part, of generally cylindrical form as shown by the drawings, and comprises essentially a casing enclosing a chamber having through one side, or end, thereof an opening, or outlet for the vapor, leading into the condenser, and through its bottom an inlet for the vapor from the pan. The casing extends below the bottom of the chamber so as to enclose a vertical passage-way for the vapor from the pan to the inlet of the chamber, and it carries within its said chamber a therewith integral, or, as indicated, thereto soldered as at 10', funnel, or hood member, 10, extending over and in register or communicating with the vapor inlet of the chamber, the interior concave surfaces of the back and top of the hood being so placed as to deflect the therein rising vapors towards the outlet of the hood or deflector, which is so presented, or aimed, as to direct the therefrom emerging vapors transversely, i. e. approximately horizontally in a direction opposite to that in which is located the condenser, and to cause the said vapor, or much of it, to impinge against the thereto opposite interior end surface of the separator as shown by the drawings, and as is of importance, the deflector or hood is spaced-apart from all sides of the chamber of the separator other than the bottom, and the hood is, within said chamber, located relatively nearer to the end thereof which is opposite to the condenser. The construction is such that the mesne course of the vapor is from within to outside of the hood on a curve of 180°, that is to over the say the course of the vapor is, comprehensively speaking, at first, horizontally, away from the condenser, next curvingly upward, and next again horizontally in the reverse, or "about face", direction, and as I have above remarked my observations indicate that to this particular course thus imparted to the vapor, or to the most part of it, is attributable its important parting with the milk solids, and that no other arrangement, nor any previous construction, of stream baffling, or vapor dividing devices interposed in the path of the vapor from the pan to the condenser is capable of separating the solids from the vapors to the same extent, or within the same space of advance, within the same time, and within the same desired proximity to the pan. As the solids separate from the vapor they fall in part therethrough to that portion of the interior surface of the separator which underlies the curve of 180° in the flow of the vapor referred to, and in large part against the interior surface and the lower limbs of the concavely curved interior extending between the delivery mouth of the hood 10 and the thereto opposite end surface and down these surfaces they are impelled by gravity to flow to the surface of the bottom of my separator, where they collect and thence flow down it, the said surface being sufficiently inclined inwards and back into the pan, where they mingle with the unvaporized residue of the milk, this collection and recovery of the solids separated from the vapor being constantly and automatically carried on during the condensing operation.

I provide means for also separating and collecting such comparatively unimportant remainders of the vapor-carried solids as escape separation during the foregoing operation. To this end, I unite with the top and sides of the hood, 10, and with the interior surface of the separater, baffle plates 11, 11', preferably of the form indicated in Figure 2, and interposed in the path of the vapor as shown. These plates assist in directing the vapor upward after its initial rise from the hood, and to enforce its horizontal reverse movement toward the condenser. For the same purpose I attach to the upper interior surface of the separator an auxiliary crescent-shaped baffle plate, 12, disposed and proportioned as indicated, and, proximate the inlet opening into the condenser, I attach to the lower interior surface of the separater still another crescent-shaped baffle plate, 13, as indicated in Figures 1 and 3. By these last referred to baffles the flow of vapor is directed first downwardly and thence upwardly as indicated by the arrows in Figure 1, and their effect is to cause some further separation of solids if any remaining in the vapor.

I provide means for also automatically returning by aid of gravity to the pan such of the solids separated from the vapor as may fall, or be precipitated, upon the exterior surfaces of the hood extending between its mouth and the baffle plate, 11. For this purpose I cut away, or offset, the lower edges 11', of the hood so as to leave between them and the adjacent interior surface of the separator slight spaces, or openings, 14, 14, sufficient to admit passage of the last mentioned solids therethrough and thus downward into the pan. It will be noted that all surfaces of my separator upon which the solids separated from the vapor can deposit, or drip, are so positioned, or conformed, as to, by aid of gravity, lead such solids finally to the bottom, or lowermost interior surface of the separator.

To enable the solids, if any, deposited in that part of the separator which extends between the baffle plate 11 and the condenser 5, to be withdrawn, an outlet pipe, 15, closed by a valve 16, is provided.

The above referred to receptacle, or pan, in which the milk is condensed and the condenser in which the resulting vapors are liquefied, are, I believe, too well known for extended explanation. In Figure 3ª a usual type of such vacuum-pan is shown in central vertical section and comprehensively designated 4. It consists essentially of a hermetically enclosing casing 4', to which the casing of my separator is air-tightly joined as above described and within which casing, 4', is thus provided a chamber for evaporation of, for example, milk. The milk is therein raised to the temperatures required for its evaporation by aid, as usual, of usual therein contained heating coils (in this instance two) indicated by the reference characters 4ª and 4ᵇ respectively, the coils being in the form of helical conduits, or pipes, through which steam, or other fluid, of suitable temperature is caused to circulate by the usual means and in the usual manner from a source not shown and by aid of respective intakes 4ᶜ, 4ᵈ and outlets 4ᵉ, 4ᶠ. In further aid of imparting desired temperatures to the material in process of evaporation in the pan, the lower part of latter is in this instance surrounded by a steam jacket 17 having an intake pipe 17ª and exhaust 17ᵇ all of usual construction and through which steam, from a usual source (not shown) is caused to circulate in the usual manner.

The condenser is also, in this instance, of well known type and is as aforesaid comprehensively designated by the reference numeral 5. It comprises a hermetically enclosing casing 5' to which the casing of my separator is air-tightly joined as above described and within which casing 5' is thus provided a chamber for condensation of the vapors in any preferred manner. In the present instance the condensation is effected by aid of spraying, through the vapor, water, or other fluid, of sufficiently reduced temperature which is, from a usual source (not shown) constantly forced by any convenient means through the vertical intake conduit, or pipe 5ª into the horizontal head 5ᵇ containing perforations 5ᶜ through which the chilled liquid issues as spray in the midst of the vapor, while air, together with the water of condensation, is constantly being exhausted through the outlet 5ᵈ by any well known means, as for example by ordinary rotary exhaust pump 18 diagrammatically indicated in Figure 3ª. The atmospheric pressure is thus reduced as greatly as may be desired throughout the train of the three hermetically inclosed and together-jointed chambers, i. e. within the pan, my separator, and the condenser. It will be understood however that although I believe the recovery of solids by my separator to be, to an extent, increased in proportion to diminution of atmospheric pressure, I do not regard its superior utility as being dependent thereon.

Having now described my invention, what I claim as new and desire to secure by Letters Patent is the following, viz:

1. In apparatus for recovering solids from vapor a separator device comprising a chamber having through one side thereof an outlet and through the bottom thereof an inlet for the vapor; a conduit for vapor upwardly extending into said inlet; and, within the chamber, a unitary passageway for the vapor leading from said inlet upwardly curvingly towards an end of the chamber opposite to said outlet, and from adjacent said end leading still upwardly curvingly in reverse direction and thence continuing doubled and superimposed over itself towards said outlet, the interior surfaces of said passage way and chamber being conformed to return thereon dropped or precipitated solids to said inlet.

2. In apparatus for recovering solids from vapor, a separator device comprising a chamber having through one side thereof an outlet, and through the bottom thereof an inlet, for the vapor; a conduit for vapor upwardly extending into said inlet; and, within the chamber, over said inlet a therewith connecting vapor-directing hood having its vent directed towards a side of the chamber opposite said outlet and its top separated from the top of the chamber by an intervening passage way for the vapor.

3. In apparatus for recovering solids from vapor, a separator device comprising a chamber having through one side thereof an outlet and through the bottom thereof an inlet for the vapor; means to continuously move the vapor from the inlet through the chamber to said outlet; means to direct the vapor upwardly into the inlet; means, from the inlet onwards, to direct the vapor in a unitary, i. e. undivided, stream in the following directions within the chamber, viz: firstly, curvingly upwardly approximately 90° towards an end of the chamber opposite to said outlet, next reversely curvingly upwardly away from said end approximately 90° towards the top of the chamber; and thence towards said outlet, the said stream being thus caused to double or bend back over itself.

4. In apparatus for recovering solids from vapor, a separator device comprising a chamber having through one side thereof an outlet and through the bottom thereof an inlet for the vapor; means to continuously move the vapor from the inlet through the chamber to said outlet; means to direct the vapor upwardly into the inlet; means, from the inlet onwards, to direct the vapor in a unitary, i. e. undivided, stream in the following directions within the chamber, viz: firstly, curvingly upwardly approximately 90° towards an end of the chamber opposite to said outlet, next reversely curvingly upwardly away from said end approximately 90° towards the top of the chamber; and thence towards said outlet, the said stream being thus caused to double or bend back over itself; and means to meanwhile, by aid of gravity, continuously withdraw from said chamber through said inlet the most part of the recovered solids.

5. In apparatus for recovering solids from vapor, a separator device comprising a chamber having through one side thereof an outlet and through the bottom thereof an inlet for the vapor; means to continuously move the vapor from the inlet through the chamber to said outlet; means to direct the vapor upwardly into the inlet; means, from the inlet onwards, to direct the vapor in a unitary, i. e. undivided, stream in the following directions within the chamber, viz: firstly, curvingly upwardly approximately 90° towards an end of the chamber opposite to said outlet, next reversely curvingly upwardly away from said end approximately 90° towards the top of the chamber; next curvingly downwardly and finally curvingly upwardly to said outlet, the said stream being thus caused to double or bend back over itself.

6. In apparatus for recovering solids from vapor, a separator device comprising a chamber having through one side thereof an outlet and through the bottom thereof an inlet for the vapor; also an outlet pipe for said solids; means to continuously move the vapor from the inlet through the chamber to said outlet; means to direct the vapor upwardly into the inlet; means from the inlet onwards, to direct the vapor in a unitary, i. e. undivided, stream in the following directions within the chamber, viz: firstly, curvingly upwardly approximately 90° towards an end of the chamber opposite to said outlet, next reversely curvingly upwardly away from said end approximately 90° towards the top of the chamber, next curvingly downwardly and finally curvingly upwardly to said outlet, the said stream being thus caused to double or bend back over itself; means to meanwhile by aid of gravity continuously withdraw the most part of said solids from said chamber through said inlet; and means to intermittently withdraw some of said solids through said outlet pipe.

7. The method of treating vapor to recover therein solids which comprises subjecting it to less than atmospheric pressure, and meanwhile moving substantially all of it in a single continuously flowing undivided stream and in the following directions, viz: firstly, vertically upwardly, next at an angle to the vertical in a given direction and curvingly upwardly, next reversely curvingly upwardly and thence horizontally until the stream has doubled or become superdisposed upon itself; and meanwhile directing the gravitating solids downwardly beside, and in contact with, the vertically upwardly flowing portions of said stream.

JOSEPH P. KIRKUP.